US011598862B2

(12) United States Patent
Henderson et al.

(10) Patent No.: US 11,598,862 B2
(45) Date of Patent: Mar. 7, 2023

(54) METHODS AND SYSTEMS FOR SPATIALLY DISTRIBUTED STROBING COMPRISING A CONTROL CIRCUIT TO PROVIDE A STROBE SIGNAL TO ACTIVATE A FIRST SUBSET OF THE DETECTOR PIXELS OF A DETECTOR ARRAY WHILE LEAVING A SECOND SUBSET OF THE DETECTOR PIXELS INACTIVE

(71) Applicants: The University Court of The University of Edinburgh, Edinburgh (GB); Sense Photonics, Inc., Durham, NC (US)

(72) Inventors: Robert Henderson, Edinburgh (GB); Hod Finkelstein, Berkeley, CA (US); Neil Calder, Edinburgh (GB); Tarek Al Abbas, Edinburgh (GB)

(*) Notice: Subject to any disclaimer, the term of this patent is extended or adjusted under 35 U.S.C. 154(b) by 513 days.

(21) Appl. No.: 16/689,379

(22) Filed: Nov. 20, 2019

(65) Prior Publication Data

US 2020/0158838 A1 May 21, 2020

Related U.S. Application Data

(60) Provisional application No. 62/769,736, filed on Nov. 20, 2018.

(51) Int. Cl.
*G01S 7/48* (2006.01)
*G01S 7/486* (2020.01)
*G01S 7/4863* (2020.01)

(52) U.S. Cl.
CPC .......... *G01S 7/4868* (2013.01); *G01S 7/4863* (2013.01)

(58) Field of Classification Search
CPC . G01S 7/48; G01S 17/88; G01S 17/06; G01S 17/04; G01S 17/02
(Continued)

(56) References Cited

U.S. PATENT DOCUMENTS 6,878,924 B2 * 4/2005 Baron ................ H04N 1/00798
250/221
10,244,181 B2 3/2019 Warren
(Continued)

FOREIGN PATENT DOCUMENTS

| EP | 0349628 | 1/1990 |
| WO | 8906464 | 7/1989 |
| WO | 2018055449 | 3/2018 |

OTHER PUBLICATIONS

PCT Notification Concerning Transmittal of International Preliminary Report on Patentability, dated Jun. 3, 2021, corresponding to PCT International Application No. PCT/US2019/062366, 9 pages.
(Continued)

*Primary Examiner* — Que Tan Le
(74) *Attorney, Agent, or Firm* — Myers Bigel, P.A.

(57) ABSTRACT

A Light Detection and Ranging (lidar) apparatus includes an emitter array comprising a plurality of emitter units configured to emit optical signals responsive to respective emitter control signals, a detector array comprising a plurality of detector pixels configured to be activated and deactivated for respective strobe windows between pulses of the optical signals; and a control circuit configured to provide a strobe signal to activate a first subset of the detector pixels while leaving a second subset of the detector pixels inactive.

26 Claims, 13 Drawing Sheets

(58) Field of Classification Search
USPC .................................... 250/214 R, 221, 205
See application file for complete search history.

(56) References Cited

U.S. PATENT DOCUMENTS

| | | |
|---|---|---|
| 2016/0259038 A1 | 9/2016 | Retterath et al. |
| 2018/0045816 A1 | 2/2018 | Jarosinski et al. |
| 2018/0143301 A1 | 5/2018 | Badoni et al. |
| 2018/0246189 A1 | 8/2018 | Smits |
| 2018/0284271 A1 | 10/2018 | Bogatscher et al. |
| 2019/0250257 A1 | 8/2019 | Finkelstein et al. |

OTHER PUBLICATIONS

Extended European Search Report for corresponding EP Application No. 19886317.7 (7 pages) (dated May 30, 2022).
PCT Notification of Transmittal of the International Search Report and the Written Opinion of the International Searching Authority, or the Declaration, dated Jan. 28, 2020, for corresponding PCT International Application No. PCT/US2019/062366.

\* cited by examiner

METHODS AND SYSTEMS FOR SPATIALLY DISTRIBUTED STROBING COMPRISING A CONTROL CIRCUIT TO PROVIDE A STROBE SIGNAL TO ACTIVATE A FIRST SUBSET OF THE DETECTOR PIXELS OF A DETECTOR ARRAY WHILE LEAVING A SECOND SUBSET OF THE DETECTOR PIXELS INACTIVE

CLAIM OF PRIORITY

This application claims priority from U.S. Provisional Application No. 62/769,736 filed Nov. 20, 2018, entitled "Spatially Distributed Strobing", the entire content and disclosure of which are incorporated by reference herein.

FIELD

The present invention is directed to Light Detection and Ranging (LIDAR or lidar) systems, and more particularly, to methods and devices to reduce power consumption in time-of-flight LIDAR systems.

BACKGROUND

Time of flight (ToF) based imaging is used in a number of applications including range finding, depth profiling, and 3D imaging (e.g., lidar). Direct time of flight measurement includes directly measuring the length of time between emitting radiation and sensing the radiation after reflection from an object or other target. From this, the distance to the target can be determined. Indirect time of flight measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples.

The emitter elements may be controlled to emit radiation over a field of view for detection by the detector elements. Emitter elements for ToF measurement may include pulsed light sources, such as LEDs or lasers. Examples of lasers that may be used include vertical cavity surface emitting lasers (VCSELs). Methods for configuring lasers for use in optical systems are discussed in U.S. Pat. No. 10,244,181 to Warren entitled "COMPACT MULTI-ZONE INFRARED LASER ILLUMINATOR."

In specific applications, the sensing of the reflected radiation from the emitter element in either direct or indirect time of flight systems may be performed using an array of single-photon detectors, such as a Single Photon Avalanche Diode (SPAD) array. SPAD arrays may be used as solid-state detectors in imaging applications where high sensitivity and timing resolution are useful.

A SPAD is based on a p-n junction device biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by means of a single incident photon striking the high field region. It is this feature which gives rise to the name "Single Photon Avalanche Diode." This single photon detection mode of operation is often referred to as "Geiger Mode."

Power consumption in lidar systems can be particularly problematic in some applications, e.g., unmanned aerial vehicle (UAV), automotive, and industrial robotics. For example, in automotive applications, the increased emission power requirements must be met by the car's power supply, which may add a considerable load for car manufacturers. Also, heat generated from the higher emission power may alter the optical performance of the light emitting array and/or may negatively affect reliability.

SUMMARY

According to some embodiments of the present disclosure, a Light Detection and Ranging (lidar) apparatus includes an emitter array comprising a plurality of emitter units configured to emit optical signals responsive to respective emitter control signals; a detector array comprising a plurality of detector pixels configured to be activated and deactivated for respective strobe windows between pulses of the optical signals; and a control circuit configured to provide a strobe signal to activate a first subset of the detector pixels while leaving a second subset of the detector pixels inactive, In some embodiments, the emitter array is further configured to emit the optical signals with an emitter cycle between consecutive ones of the optical signals, and the control circuit is further configured to provide the strobe signal to activate the first subset of the detector pixels at a first time delay during the emitter cycle while the second subset is inactive.

In some embodiments, the strobe signal is a first strobe signal, and the control circuit is further configured to provide a second strobe signal to activate the second subset of the detector pixels at a second time delay during the emitter cycle while leaving the first subset of the detector pixels inactive.

In some embodiments, the first strobe signal is configured to be active for a first time duration, and the second strobe signal is configured to be active for a second time duration, different from the first time duration.

In some embodiments, the second time delay is greater than the first time delay.

In some embodiments, the detector array comprises rows and columns, and the first subset of the detector pixels comprises a row of the detector array or a column of the detector array.

In some embodiments, the first subset of the detector pixels comprises a first detector pixel and a second detector pixel, and the control circuit is further configured to activate the second detector pixel at a time offset after activating the first detector pixel.

In some embodiments, the detector array comprises a first sub-array comprised of detector pixels that are physically collocated and a second sub-array comprised of detector pixels that are physically collocated, and the first subset of the detector pixels comprises a first detector pixel of the first sub-array and a second detector pixel of the second sub-array.

According to some embodiments of the present disclosure, a Light Detection and Ranging (lidar) apparatus includes an emitter configured to emit a first optical signal and a second optical signal with an emitter cycle therebetween; a detector array comprising a plurality of detector pixels configured to be activated and deactivated for respective strobe windows during the emitter cycle; and a control circuit configured to apply a first strobe window within the emitter cycle to a first subset of the plurality of detector pixels at a first time delay within the emitter cycle and to apply a second strobe window within the emitter cycle to a second subset of the plurality of detector pixels at a second time delay, different from the first time delay, within the emitter cycle In some embodiments, a first portion of the first strobe window overlaps a second portion of the second strobe window within the emitter cycle.

In some embodiments, the detector array comprises rows and columns, and the first subset of the detector pixels comprises a row of the detector array or a column of the detector array.

In some embodiments, the first subset of the detector pixels comprises a first detector pixel and a second detector pixel, and the control circuit is configured to activate the second detector pixel at a time offset after activating the first detector pixel.

In some embodiments, the first time delay and the second time delay are configured to be programmatically controlled.

In some embodiments, a first duration of the first strobe window is different than a second duration of the second strobe window.

In some embodiments, the second time delay is greater than the first time delay, and a first duration of the first strobe window is shorter than a second duration of the second strobe window.

In some embodiments, the second time delay is greater than the first time delay, and a first duration of the first strobe window is longer than a second duration of the second strobe window.

In some embodiments, the detector array comprises a first sub-array comprised of detector pixels that are physically collocated and a second sub-array comprised of detector pixels that are physically collocated, and the first subset of the detector pixels comprises a first detector pixel of the first sub-array and a second detector pixel of the second sub-array.

According to some embodiments of the present disclosure, a lidar apparatus includes an emitter configured to emit a first optical signal and a second optical signal with an emitter cycle therebetween; a detector array comprising a plurality of detector pixels configured to be activated and deactivated for respective strobe windows during the emitter cycle; and a control circuit configured to provide a strobe signal to activate a first subset of the plurality of detector pixels and a second subset of the plurality of detector pixels within the emitter cycle at different respective time delays with respect to the first optical signal.

In some embodiments, the control circuit is further configured to provide the strobe signal to activate the first subset during a first strobe window within the emitter cycle, and the control circuit is further configured to provide the strobe signal to activate the second subset during a second strobe window within the emitter cycle.

In some embodiments, a first portion of the first strobe window overlaps a second portion of the second strobe window.

In some embodiments, a first duration of the first strobe window is different that a second duration of the second strobe window.

In some embodiments, the detector array comprises rows and columns, and the first subset of the detector pixels comprises a row of the detector array or a column of the detector array.

In some embodiments, the first subset of the detector pixels comprises a first detector pixel and a second detector pixel, and the control circuit is configured to activate the second detector pixel at a time offset after activating the first detector pixel.

In some embodiments, the different respective time delays are configured to be programmatically controlled.

In some embodiments, a first respective time delay of the first strobe window is shorter than a second respective time delay of the second strobe window, and a first duration of the first strobe window is shorter than a second duration of the second strobe window.

In some embodiments, a first respective time delay of the first strobe window is shorter than a second respective time delay of the second strobe window, and a first duration of the first strobe window is longer than a second duration of the second strobe window.

DETAILED DESCRIPTION

A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire a three-dimensional perspective (e.g., a point cloud) of one or more targets by emitting light from an array of emitters, or a subset of the array, for short durations (pulses) over a field of view (FoV) or scene, and detecting the echo signals reflected from the targets in the FoV at one or more detectors. A non-flash or scanning lidar system may generate image frames by raster scanning light emission (continuously) over a field of view or scene, for example, using a point scan or line scan to emit the necessary power per point and sequentially scan to reconstruct the full FoV.

Figure 1A:
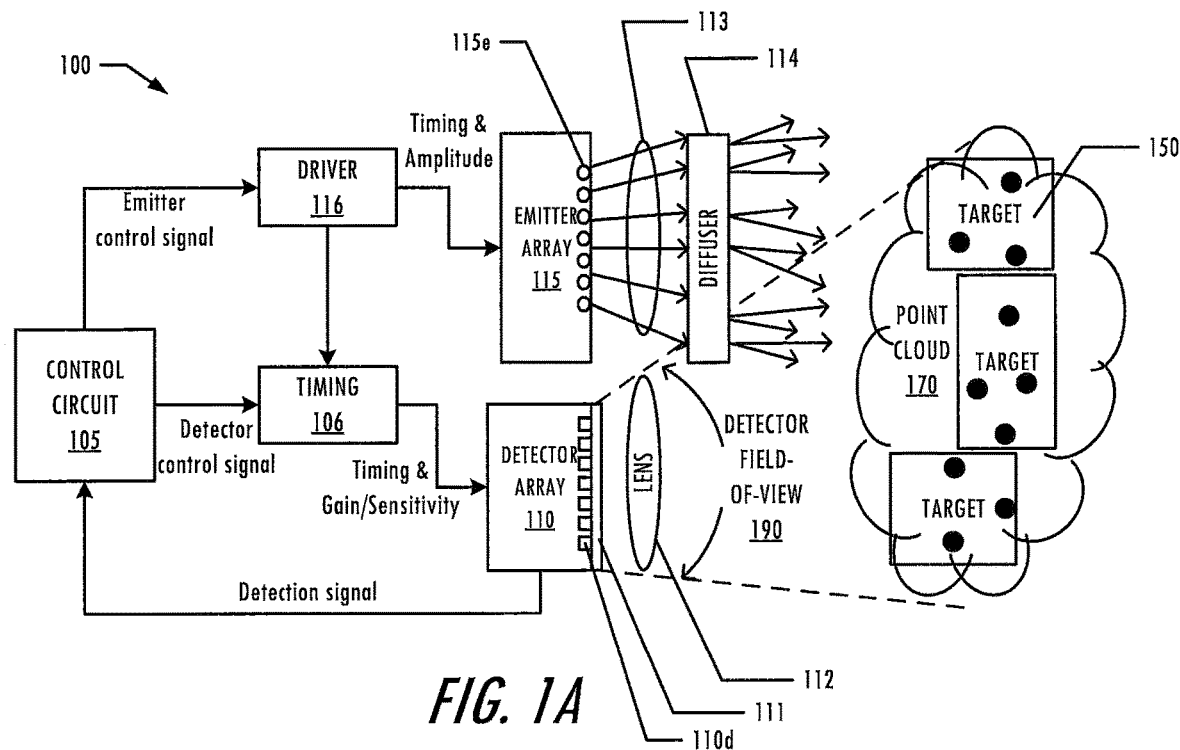
FIG. 1A is an example lidar system according to some embodiments described herein.

An example of a lidar system or circuit 100 in accordance with embodiments of the present disclosure is shown in FIG. 1A. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113, 114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash lidar system 100. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1A.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150.

Figure 1B:
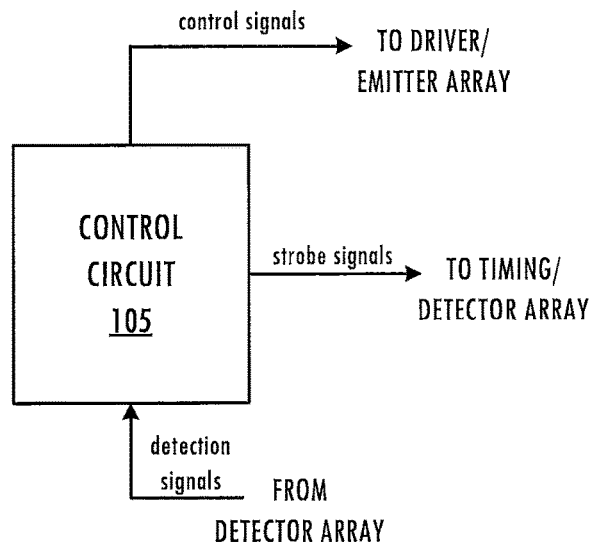
FIG. 1B is an example of a control circuit that generates emitter and/or detector control signals according to some embodiments described herein.

An example of a control circuit 105 that generates emitter and/or detector control signals is shown in FIG. 1B. The control circuit of FIG. 1B may represent one or more control circuits, for example, an emitter control circuit that is configured to provide the emitter control signals to the emitter array 115 and/or a detector control circuit that is configured to provide the strobe signals to the detector array 110 as described herein. Also, the control circuit 105 may include a sequencer circuit that is configured to coordinate operation of the emitters 115e and detectors 110d. More generally, the control circuit 105 may include one or more circuits that are configured to generate the respective detector signals that control the timing and/or durations of activation of the detectors 110d, and/or to generate respective emitter control signals that control the output of optical signals from the emitters 115e.

In some lidar implementations, different imaging distance ranges may be achieved by using different emitters 115e. For example, an emitter 115e configured to illuminate targets 150 up to a 200 meter (m) distance range may be operated to emit four times the power per solid angle as an emitter 115e configured to image up to a 100 m distance range. In some embodiments, a same emitter 115e may be configured to utilize different power levels depending on a distance being imaged. For example, if the lidar system 100 is configured to illuminate targets 150 at, for example, a distance of 200 meters from the emitter array 115, the emitter 115e may be driven at a first power level. If the lidar system 100 switches or is otherwise configured (e.g., dynamically) to illuminate targets 150 at, for example, a distance of 100 meters from the emitter array 115, the emitter 115e may be driven at a second power level that is less than the first power level.

Strobing as used herein may refer to the generation of detector control signals (also referred to herein as strobe signals or 'strobes') to control the timing and/or duration of activation (also referred to herein as strobe windows) of one or more detectors 110d of the lidar system 100. That is, some embodiments described herein can utilize range strobing (i.e., biasing the SPADs to be activated and deactivated for durations or windows of time over the emitter cycle, at variable delays with respect to the firing of the emitter (e.g., a laser), thus capturing reflected signal photons corresponding to specific distance sub-ranges at each window/frame) to limit the number of ambient photons acquired in each emitter cycle. An emitter cycle (e.g., a laser cycle) refers to the time between emitter pulses. In some embodiments, the emitter cycle time is set as or otherwise based on the time required for an emitted pulse of light to travel round trip to the farthest allowed target and back, that is, based on a desired distance range. To cover targets within a desired distance range of about 200 meters, a laser in some embodiments may operate at a frequency of at most 750 kHz (i.e., emitting a laser pulse about every 1.3 microseconds or more).

A range-strobing flash lidar (e.g., with strobe windows corresponding to respective distance ranges) may use strobing for several reasons. For example, in some embodiments, detector elements may be combined into pixels and the detector elements and/or pixels may be selectively activated after the emission of optical signals to detect echo signals from a target during specific strobe windows. The detected echo signals may be used to generate a histogram of detected "counts" of photons incident on the detector from the echo signal. Examples of methods to detect a target distance based on histograms are discussed, for example, in U.S. patent application Ser. No. 16/273,783, filed Feb. 12, 2019, entitled "METHODS AND SYSTEMS FOR HIGH-RESOLUTION LONG-RANGE FLASH LIDAR," the contents of which are incorporated herein by reference.

The detectors (e.g., SPADs) may be biased such that they are inactive during the firing of a lidar's emitter as well as during a period of time corresponding to the minimum range of the lidar system. In some implementations, an array of capacitors may be provided in the lidar system so as to allow charge distribution and fast recharging of the detector array.

In some embodiments, the detection may start with a timing signal (e.g., a start signal) shortly after the emitter (e.g., laser) fires and may end upon the earlier of a trigger by an avalanche or an end to the active time window (e.g., an end signal). In some embodiments, the detection may begin with or responsive to an avalanche, if one occurs, and may end just before the firing of the subsequent laser pulse. In some embodiments the timing signals (e.g., start and end signals) are not the start of the laser cycles or the end of the laser cycles but are signals timed between the start and the end of the cycle. In some embodiments, the timing of the start and end signals are not identical during all cycles, for example, allowing strobing of the range.

In some implementations, the recharging scheme is passive and as soon as an avalanche occurs, the SPAD device immediately and quickly recharges. In some embodiments, the recharge circuit is active, and the recharge time is electrically controlled. In some embodiments, the active recharge circuitry biases the SPADs beyond breakdown for a time correlated with the firing of a laser pulse. In some embodiments the recharge circuitry biases the SPADs for a portion of the time required for a pulse of light to traverse a round trip to the farthest target and back (e.g., a "strobe window") and this strobe window is varied so as to strobe the range of the lidar. In some embodiments, the active recharge circuitry maintains the SPAD at its recharge state a sufficiently long time to release a sufficiently large percentage of trapped charges (for example, 1 ns, 2 ns, 3 ns, 5 ns, 7 ns, 10 ns, 50 ns, or 100 ns), and then quickly recharges the SPAD.

In detector arrays utilizing. SPADs, the entire array may receive the same strobe windows simultaneously. Such a technique may be referred to as Global Strobe Distribution. As used herein, the strobe window may be a time duration (e.g., a pulse width) of the strobe signal in which the SPAD is biased to determine if the SPAD has detected a photon. For example, in a SPAD array of 600×300 SPAD pixels, all 180K pixels may receive the same strobe window. The strobe windows may be repeated multiple times within a sub frame. At the end of this period, the sub-frame may be read out, for example, to count the number of detected photons. Subsequently, the process may again start by exposing the next strobe window and repeating the operations. In some embodiments, the respective SPADs may be "reset" in between strobe windows and/or subframes.

However, such a technique may lead to a large SPAD capacitance to recharge multiple and/or all of the SPADs simultaneously. For example, in some embodiments, each pixel may include two SPAD microcells, each being approximately 10 μm×10 μm, with approximately 100 fF capacitance per SPAD microcell. In such an embodiment, if 180 k pixels are present, each with 100 fF of capacitance, the total capacitance associated with the recharge operation may be 180 k×100 fF×2=~40 nF.

In addition, there may be a large coincident pixel peak power for short range planar targets (e.g., a side on a white truck 10 m away). For example, such a target may cause all of the SPADs to activate, which may generate an increase in power consumption. For example, 180 k pixels×100 µA×1.1V=18 W of power.

A different technique that may avoid and/or reduce these issues is the use of spatial strobe distributions. Spatial strobe distribution may distribute strobes spatially throughout the pixel array so that a subset of pixels is simultaneously active for a planar target. Spatial strobe distribution may result in reduced peak SPAD recharge current, spread out over multiple strobe windows in a laser cycle. Spatial strobe distribution may also result in reduced pixel activity peak power, spread out over multiple strobe windows in the laser cycle.

Figure 2A:
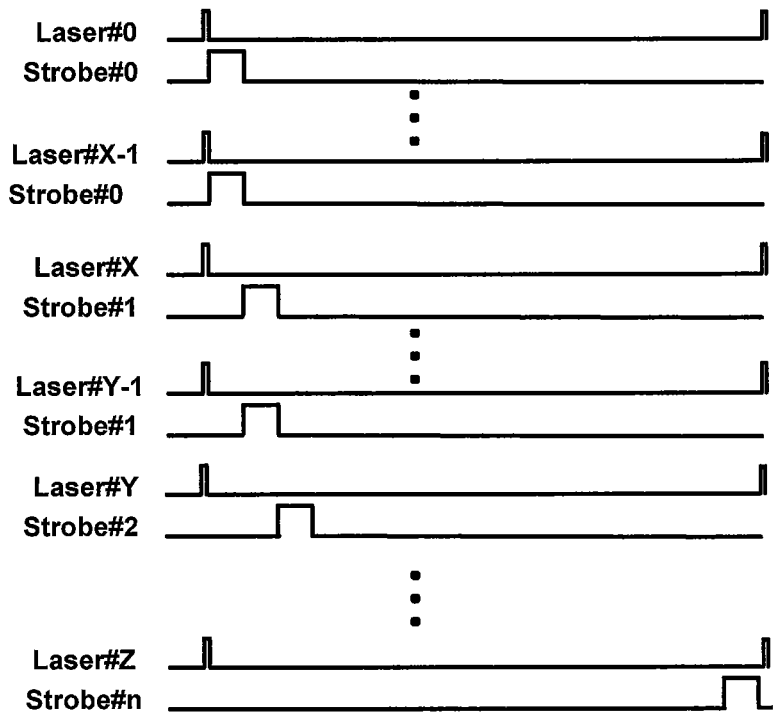
FIGS. 2A and 2B illustrate a comparison between global strobe distribution (FIG. 2A) and spatial strobe distribution according to some embodiments described herein.
Figure 2B:
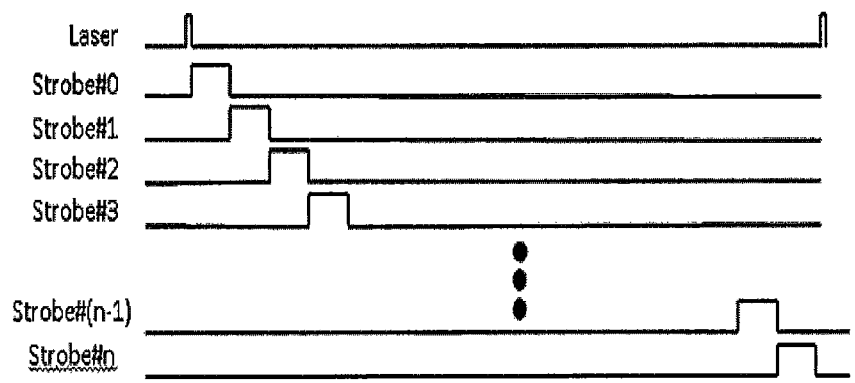

FIGS. 2A and 2B illustrate a comparison between global strobe distribution (FIG. 2A) and spatial strobe distribution (FIG. 2B) according to some embodiments described herein. As illustrated in FIGS. 2A and 2B, an example laser cycle may be broken into n strobe windows. For example, a laser cycle time (e.g., time between emitted lasers) may be 1.3 µs. The laser cycle may be broken into n strobe windows such as, for example, sixteen strobe windows. In such an example, the strobe windows may be distributed at 81 ns each within the 1.3 µs of the laser cycle. The timing between laser pulses discussed with respect to FIGS. 2A and 2B is merely an example. Other timings may be possible without deviating from the invention.

FIG. 2A illustrates an example of global strobe distribution. In particular, FIG. 2A illustrates the timing of a succession of n strobe windows with respect to the laser pulses of the lidar system, with each strobe window 1 to n defining a duration of activation for the detectors (e.g., SPADs) of the lidar system at respective delays that differ with respect to the laser pulses, responsive to respective strobing signals Strobe #0 to Strobe #n. In some embodiments, the individual strobe windows may be identical in duration, as shown in FIG. 2A. An image subframe may include includes multiple laser pulses, with multiple strobe windows between respective ones of the laser pulses. For example there may be about 1000 laser cycles in each subframe. Each subframe may also represent data collected for a respective strobe window. A strobe window readout operation may be performed at the end of each subframe, with multiple subframes (corresponding to a respective strobe window) making up each image frame (for example, 20 sub frames in each frame).

For detection purposes, some lidar systems activate a particular strobe for a given detector only once with respect to a particular laser pulse. In other words, a detector (e.g., a SPAD and/or a collection of SPADs in a SPAD pixel) may only be active for a single strobe window (with a corresponding distance sub-range) for a particular laser cycle. FIG. 2A illustrates an example of the timing of the Strobe #0 to Strobe #n in relation to their respective laser pulses. For example, FIG. 2A illustrates that a particular strobe window (e.g., a particular time of activation for a detector corresponding to a particular distance range) might be used for multiple laser cycles. For example, a first strobe window (e.g., Strobe #0) may be used for a plurality of laser cycles (e.g., Laser #0 to Laser #(X−1)) for all of the detectors. A second strobe window (e.g., Strobe #1) corresponding to a different distance sub-range, may be used for a second plurality of laser cycles (e.g., Laser #X to Laser #(Y−1)). This progression may continue through subsequent strobe windows, corresponding to different distance sub-ranges, until each of the distance sub-ranges (e.g., n strobe windows) have been sampled, with multiple laser cycles being utilized for each distance sub-range. Though FIG. 2A describes the use of lasers as optical emitters, it will be understood that other types of optical signals may also be used without deviating from the scope and spirit of the invention.

A time between the pulses of the optical signals (and/or the corresponding strobe windows) may correspond to a distance range (e.g., a time it takes for a photon to travel from the emitter, to a target at the distance range, and back to the detector), and the respective strobe windows may thus correspond to sub-ranges of the distance range. For example, to image a distance range of 200 meters (m), ten respective strobe windows may be defined to cover distance sub-ranges of 1 m-20 m, 20 m-40 m, 40 m-60 m, . . . , and 180 m-200 m. Though ten strobe windows are used as an example to make the distance sub-ranges more clear, it will be understood that different numbers of strobe windows (e.g., sixteen strobe windows) may be used with a corresponding change to the distance sub-ranges covered.

As discussed above, in a global strobe distribution, the respective strobe window for a particular laser cycle may be globally applied to multiple and/or all of the detectors of the lidar system. Thus, during a given laser cycle, all of the detectors of the lidar system may be each sampling a particular distance sub-range. The lidar system can collect all of the counts for the detected photons of the detectors to generate a point cloud.

FIG. 2B illustrates an arrangement of strobe windows for a spatial strobe distribution according to some embodiments described herein. As illustrated in FIG. 2B, with spatial strobe distribution, more than one strobe window may be activated during a particular laser cycle. Rather than globally providing a same strobe window (and associated distance sub-range) to all of the detectors of the lidar system, different strobe windows may be applied to different detectors of the detector array, depending on the spatial distribution scheme being used. Thus, during a given laser cycle, a first strobe window (e.g., Strobe #0) may be applied to a first detector (e.g., a SPAD and/or SPAD pixel) and/or a first subset of detectors at a first time delay (associated with a particular distance sub-range) after the emission of the laser pulse. During that same laser cycle, a second strobe window (e.g., Strobe #n) may be applied to a second detector (e.g., a SPAD and/or SPAD pixel) and/or a second subset of detectors at a second time delay (associated with a second distance sub-range) after the emission of the laser pulse. In this way, different detectors of the detector array may be activated at different times during a laser cycle.

Various spatial arrangements of the strobes within the pixel array are possible. One example of a spatial distribution may include arrangements of sub-arrays among the pixel array. The sub-array may include a plurality of detectors (e.g., pixels) that are physically collocated. For example, a square arrangement of detectors within the pixel array may be grouped as a sub-array. Sub-array arrangements may ease signal routing. One example of a spatial distribution may include individual or groups of columns and/or rows among the pixel array, which may similarly provide easier routing.

Figure 3:
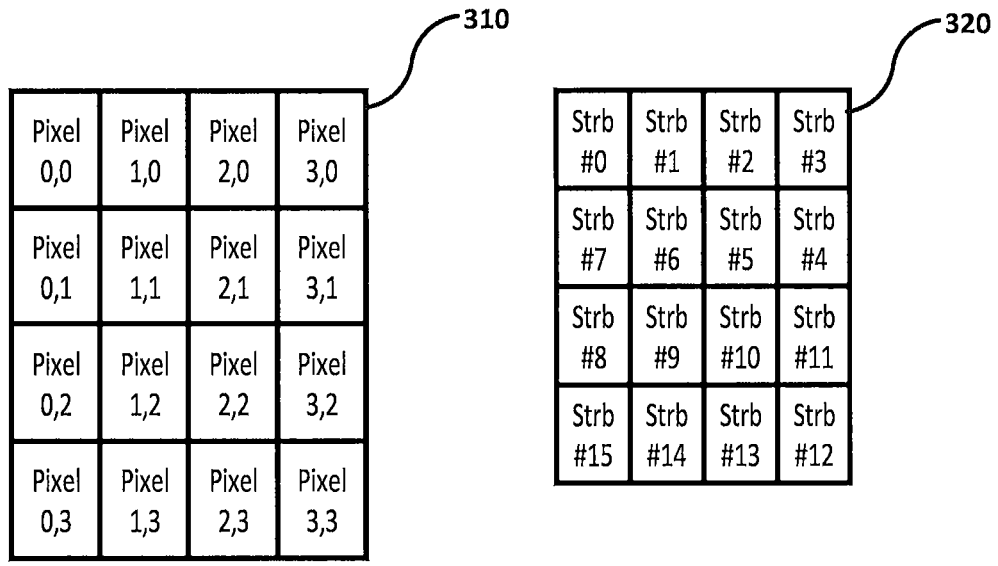
FIGS. 3, 4, and 5 illustrate example spatial strobe distributions according to some embodiments described herein.

FIG. 3 illustrates an example of a sub-array spatial distribution for an example sub-array of 16 SPADs and/or pixels within a pixel, according to some embodiments of the invention. As used herein, a pixel may refer to both an individual detector (e.g., a SPAD) and a group of detectors. For example, a pixel may include a 4×4 arrangement of detectors (e.g., SPADs). FIG. 3 illustrates an example pixel array 310 of 16 pixels forming a sub-array of the pixels of a lidar system in which each pixel is labelled as Pixel C,R, where C indicates the column of the pixel in the pixel array and R indicates the row of the pixel in the pixel array. A lidar system, such as the lidar system may include a plurality of such pixel arrays 310. That is to say that a detector array 110 (see FIG. 1) of a lidar system 100 may include one or more of the pixel array 310. FIG. 3 also illustrates a particular strobe window configuration 320 of n strobe windows, where n is an integer. The strobe window configuration 320 illustrates an ordering of the strobe windows as applied to particular pixel positions of the pixel array 310 during a given laser cycle. In FIG. 3, the strobe window configuration 320 is intended to illustrate how the strobe windows could be applied to the pixel array 310. For example, a Strb #0 designation in a particular cell of the strobe window configuration 320 is intended to indicate that the corresponding pixel (e.g., Pixel 0,0) in the pixel array 310 will be activated during Strobe #0 (e.g., that Strobe #0 will be applied to Pixel 0,0). A Strb #1 designation in another cell of the strobe window configuration 320 is intended to indicate that the corresponding pixel (e.g., Pixel 0,1) in the pixel array 310 will be activated during Strobe #1, which is the subsequent strobe window after Strobe #0, and so on.

FIG. 3 illustrates a sub-array spatial distribution in which a particular pixel is selected during each strobe window. FIG. 3 is merely an example of one embodiment of a sub-array strobe distribution (e.g., a raster distribution), and is not intended to be limiting. As shown in FIG. 3, the sub-array strobe distribution 320 may be based on sequentially processing the pixels based a position of the pixel in a row (e.g., left to right). When a particular row is complete, the next strobe window may continue with the next row in the opposite direction (e.g. right to left). One of ordinary skill in the art will recognize that other configurations of sub-array-based processing may be used without deviating from the inventive concepts.

Figure 4:
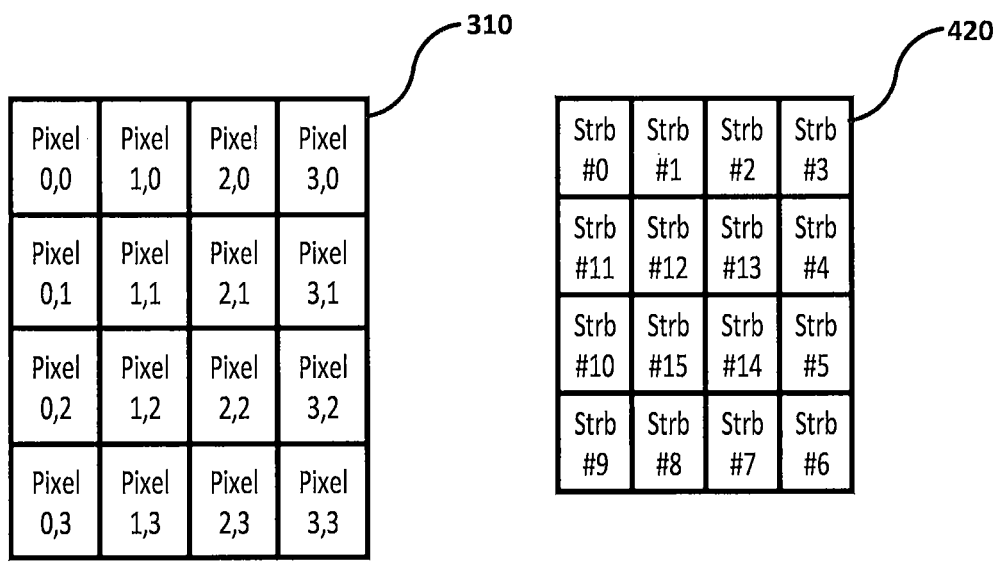

For example, FIG. 4 illustrates a "spiral" sub-array strobe distribution 420 according to some embodiments of the present invention. In FIG. 4, the spiral distribution 420 is applied to a similar pixel array 310 as in FIG. 3. As illustrated in FIG. 4, strobing during a particular laser cycle may proceed along a particular row, then along a particular column, alternating in a spiral pattern towards the center of the pixel array 310.

Figure 5:
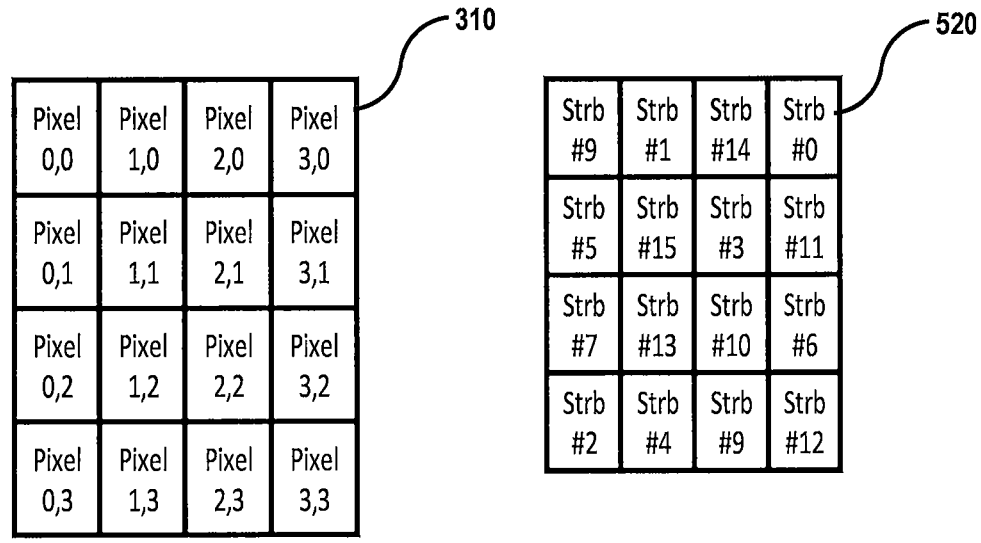

FIG. 5 illustrates another example of a random sub-array strobe distribution 520 according to some embodiments of the present invention. As illustrated in FIG. 5, strobing during a particular laser cycle may proceed randomly within the pixel array 310, with pixels non-repeatedly selected during the laser cycle without a particular pattern. In some embodiments, the random sub-array strobe distribution 520 may be different in different laser cycles. For example, the random sub-array strobe distribution 520 may be reconfigured every laser cycle, but the present invention is not limited thereto. In some embodiments, random sub-array strobe distribution 520 may be reconfigured after a particular time duration. The examples of sub-array processing described herein are intended to be illustrative only, and not limiting of the embodiments described herein.

Figure 6:
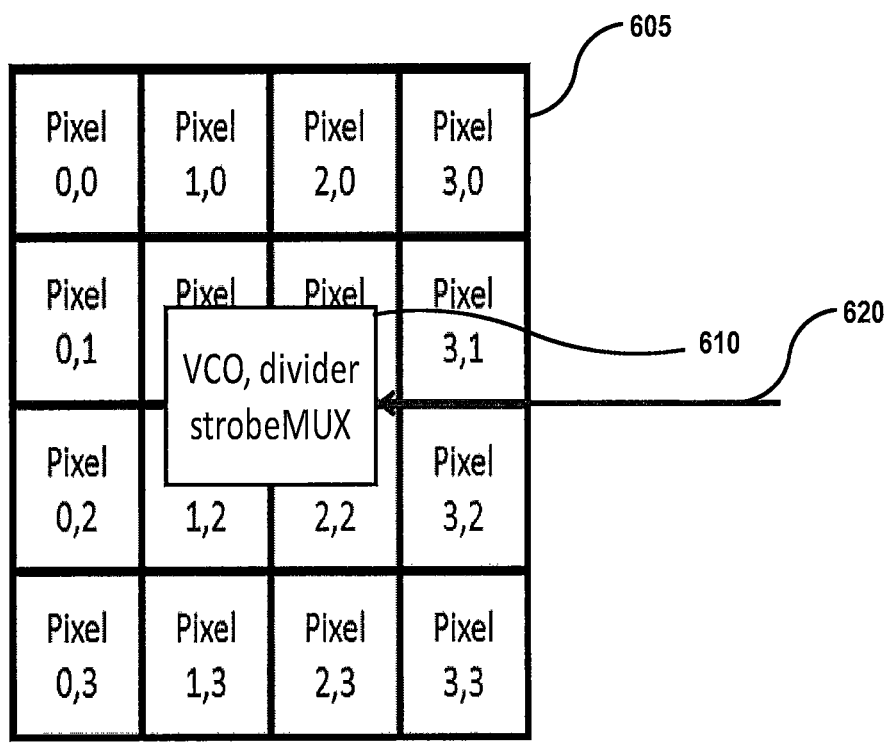
FIG. 6 illustrates an example digital pixel configuration, according to some embodiments described herein.

FIG. 6 illustrates an example digital pixel configuration, according to some embodiments described herein. FIG. 6 illustrates a digital pixel implementation incorporating a pixel sub-array 605 in which a digital pixel strobe generator may use an always-on voltage controlled oscillator (VCO) 610 that is shared at the center of the sub-array 605. A signal from the VCO 610 may be distributed in rotation to each of the pixel counters when and if a correlator triggers. The correlator may be configured to output respective correlation signals representing detection of one or more photons by the detector whose respective time of arrival is within a predetermined correlation time relative to at least one other detected photon. Correlator circuits are discussed, for example in U.S. patent application Ser. No. 16/273,783, filed Feb. 12, 2019, entitled "METHODS AND SYSTEMS FOR HIGH-RESOLUTION LONG-RANGE FLASH LIDAR." In the embodiment of FIG. 6, the VCO frequency may be low (e.g., <2 GHz) as there may be less emphasis for precise timestamp digitization with laser pulses whose duration is a few (e.g., less than 10) nanoseconds. In some embodiments, a clock synchronization signal 620 may be provided to the VCO 610.

Figure 7:
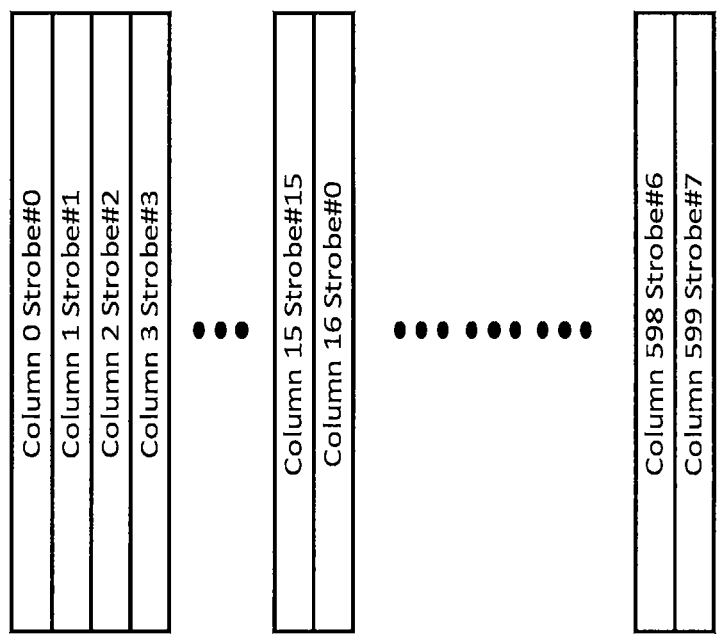
FIG. 7 illustrates another example of a column strobe distribution according to some embodiments described herein.

FIG. 7 illustrates another example of a column strobe distribution according to some embodiments described herein. As illustrated in FIG. 7, during each strobe window, the pixels of one or more columns of the pixel array may be strobed simultaneously. For example, if sixteen strobe windows are defined, Column 0, Column 16, Column 32, etc., (e.g., every sixteenth column) may be strobed during the first window, Column 1, Column 17, Column 33, etc., may be strobed during the second window, and so on. The examples of column processing in FIG. 7 are intended to be illustrative only, and not limiting of the embodiments described herein. Row processing may be performed similarly as described in FIG. 7, but with the processing element being rows of the pixel array rather than columns.

Figure 8:
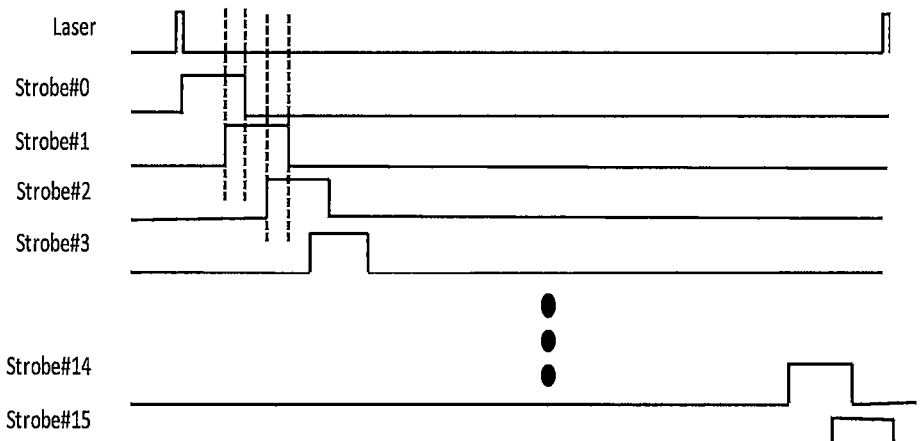
FIG. 8 illustrates another example of overlapping strobe windows according to some embodiments described herein.

In addition to the strobe distribution variations discussed herein, additional improvements may be obtained through the use of various configurations of strobe window timing. In some embodiments, an improvement may be achieved by having strobe windows overlapping, for example, by a fraction of the strobe window width to account for a scenario of the laser returns from a target being distributed across two adjacent strobe windows. The fraction may be for example, $\frac{1}{20}$, $\frac{1}{10}$, $\frac{1}{5}$, $\frac{1}{4}$, $\frac{1}{3}$, $\frac{1}{2}$, etc. of the strobe window. This embodiment is illustrated in FIG. 8. Overlapping strobes may result in a slight increase in strobe length. The use of overlapping strobes may be used in combination with strobe distribution schemes discussed herein (e.g., pixel sub-array, row-based, column-based, etc.).

Figure 9:
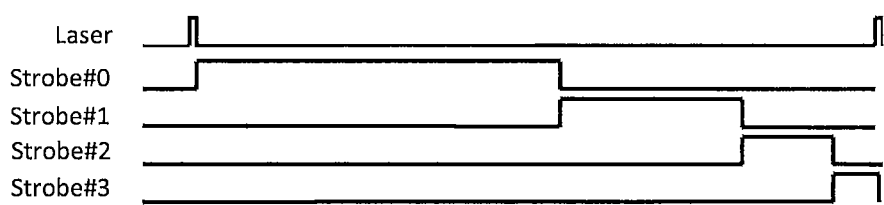
FIG. 9 illustrates an example using strobe windows of different durations according to some embodiments described herein.

In some embodiments, improvements may be achieved by having strobes of different durations. For example, it may be advantageous, in order to equalize a signal-to-background ratio (SBR), that short range strobe windows (e.g., strobe windows that are associated with closer distance sub-ranges) are longer or shorter in duration than long range strobe windows. The durations may be allocated by approximately $1/r^2$ where r is distance from transmitter. FIG. 9 illustrates an example using strobe windows of different durations according to some embodiments described herein. Such a scheme provides that the acquisition window for farther targets, which are weaker, is shorter, thus allowing fewer ambient photons to arrive, and thereby achieving a higher signal to background ratio when calculating an average time of arrival as compared with a uniform strobe window scenario. Though FIG. 9 illustrates an example in which acquisition for farther targets is shorter, it will be understood that other configurations are possible. For example, the configuration of FIG. 9 could be reversed, and short range strobe windows (e.g., strobe windows that are associated with closer distance sub-ranges) may be shorter in duration than longer range strobe windows (e.g., the strobe window durations may increase as the distance range increases).

Figure 10:
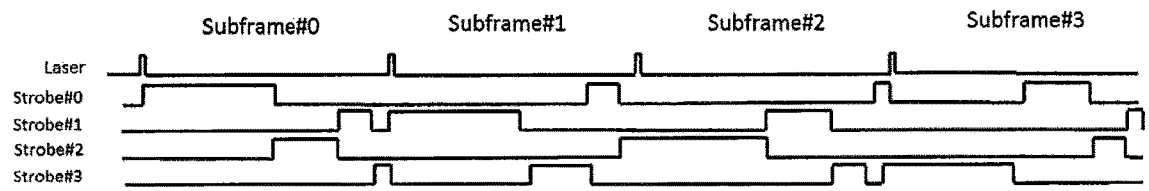
FIG. 10 illustrates an example of pseudo-random strobe cycle durations according to some embodiments described herein.

In some embodiments, pseudo-random cycle durations may be used. In some implementations, issues may arise related to interference between multiple lidar systems. One solution may include making the signals of one lidar system look as random as possible to the outside world (i.e., another lidar system), but synchronous to the originating lidar. Spatially sampling different distance sub-ranges in different pixels in different sub-frames may have some dithering action on an interfering lidar system, as lidar systems according to example embodiments described herein may sample a given distance sub-range in a given pixel at a different sub-frame sequence. FIG. 10 illustrates an example of pseudo-random strobe cycle durations according to some embodiments described herein. In some embodiments, the sequence illustrated in FIG. 10 may not repeat.

Figure 11:
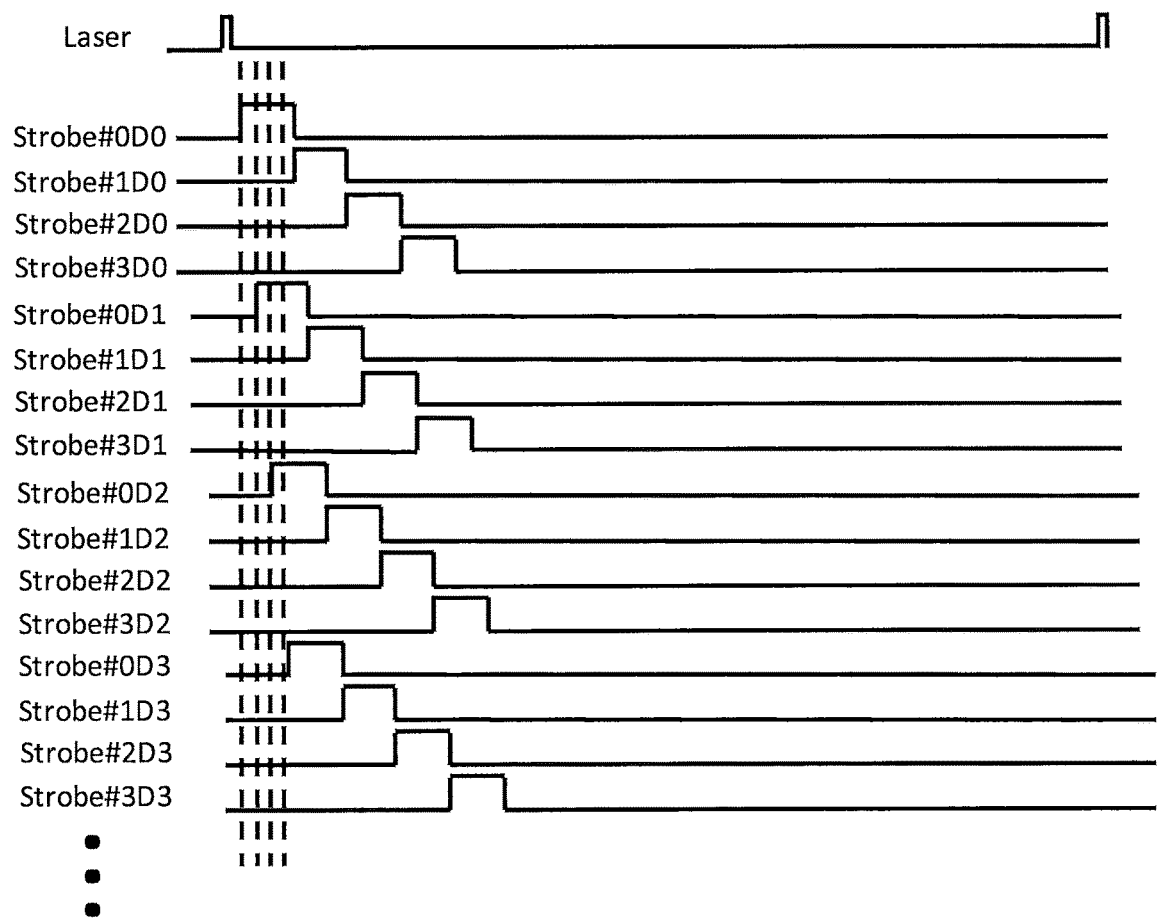
FIG. 11 illustrates an example of constant activity strobing according to some embodiments described herein.

In some embodiments, constant activity strobing may be used. FIG. 11 illustrates an example of constant activity strobing according to some embodiments described herein. For example, one approach to spatially distributed strobing is to have more strobes of the same duration slightly time offset from one another by constant delay intervals. Using the example of sixteen strobes discussed previously, four equal delays of the strobe gates may be used. As illustrated in FIG. 11, a first strobe (e.g., Strobe #0) may be applied to four different detectors with a corresponding time delay between each of the strobe window applications. For example, the Strobe #0 applications are shown as Strobe #0D0 (Strobe #0 applied to detector 0), Strobe #0D1 (Strobe #0 applied to detector 1), Strobe #0D2 (Strobe #0 applied to detector 2), and Strobe #0D3 (Strobe #0 applied to detector 3). This pattern is repeated for Strobe #1, Strobe #2, and Strobe #3, and beyond. In some embodiments, D0 and D1 may be neighboring detectors in a pixel array (see, e.g., FIG. 12, discussed below) and may be enabled sequentially. For example, Strobe #0D0, Strobe #0D1, Strobe #0D2, Strobe #0D3 may activate detectors in neighboring pixel arrays at time points that are offset by a fraction (e.g., ¼) a strobe period. Though FIG. 11 illustrates Strobe #0, Strobe #1, Strobe #2, and Strobe #3 all being applied to, for example Detector 0 (D0), it will be understood that different detectors can be activated for different ones of the strobe windows. Similarly, though FIG. 11 illustrates only four detectors (e.g., D0, D1, D2, D3) it will be understood that this is for the purpose of example only, and lidar systems according to embodiments described herein may include additional detectors. Thus, additional strobe windows may be provided which extend across all, or a majority of, the laser cycle.

Such delays between corresponding strobe windows may be accomplished, for example, in a circuit using a delay locked loop (DLL). In such an example, there may be four sets of sixteen strobes offset from each other by 20.25 ns (81 ns/4). The SPAD recharge current would then be distributed at 64×20.25 ns intervals rather than 16×81 ns intervals. This may break up a time midpoint of the window interval. In some embodiments, this may lead to an easier external correction of errors. In some embodiments using constant activity strobing, an external system may subtract the spatial time offset from each pixel laser return estimate. In the example of FIG. 11, only four of the sixteen strobe windows are shown.

Figures 12, 13:
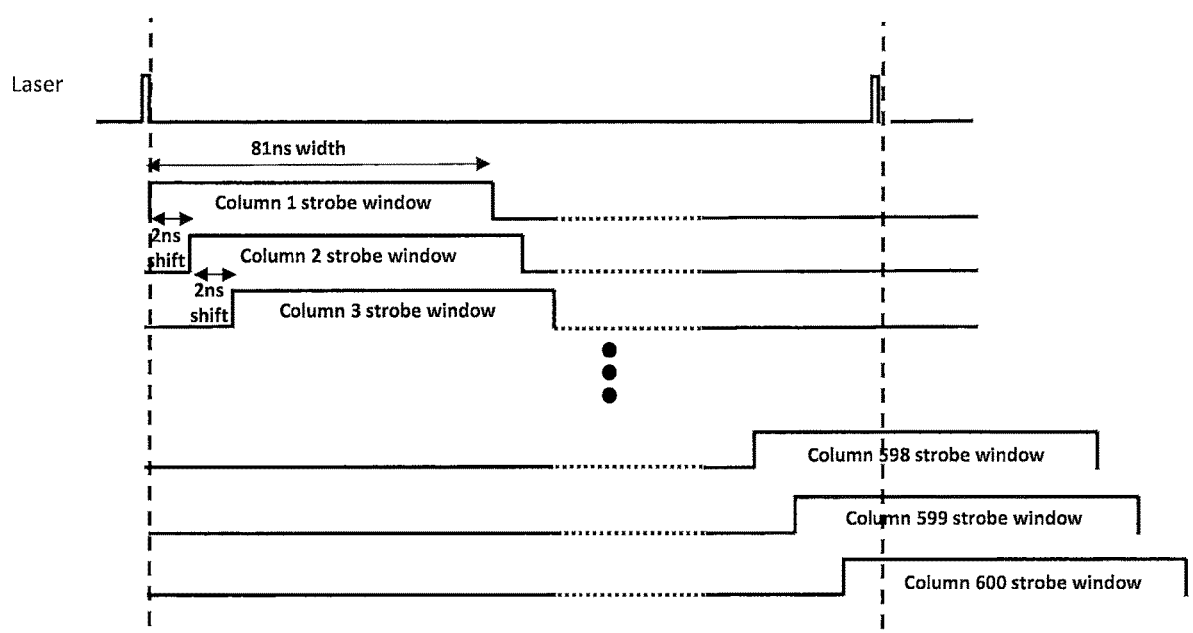
FIG. 12 illustrates an example of sub-array constant activity strobe distribution (raster) according to some embodiments described herein.
FIG. 13 illustrates an example of a constant sliding strobe window according to some embodiments described herein.

In some embodiments, pixel sub-array strobe distribution may be combined with constant activity strobe distribution. FIG. 12 illustrates an example of sub-array constant activity strobe distribution (raster) 1220 according to some embodiments described herein.

In some embodiments, processing of one sub-array of pixels may be performed slightly offset from another sub-array of pixels. For example, in FIG. 12 four sub-arrays 1210_a, 1210_b, 1210_c, and 1210_d are illustrated. Strobe windows may be applied to corresponding ones of the four sub-arrays 1210_a, 1210_b, 1210_c, and 1210_d in a manner similar to that in FIG. 3. However, a first strobe window (e.g., Strobe #0) applied to a first detector of the first sub-array 1210_a (e.g., STRB #0D0) may be offset in time from the first strobe window that is applied to a first detector of the second sub-array 1210_b (e.g., STRB #0D1), which may be offset from the first strobe window that is applied to a first detector of the third sub-array 1210_c (e.g., STRB #0D2), and so on. The second strobe window (e.g., Strobe #1) may be applied to the next one of the various sub-arrays in the strobe distribution with a similar offset. Though the delayed sub-arrays are illustrated as being adjacent in FIG. 12, it will be understood that this is merely an example. As will be understood by one of ordinary skill in the art, many other patterns are possible with an increasing number of the delayed groups. For example, the offset strobe windows may also be applied to the strobe distributions 420, 520 of FIGS. 4 and 5, or any other strobe distribution described herein.

In some embodiments, a constant sliding strobe window scheme may be used. FIG. 13 illustrates an example of a constant sliding strobe window according to some embodiments described herein. This scheme distributes the strobe windows in a column format for easy generation and reduced wiring. For example, with 600 columns, 600 separate strobes may be generated. For example, in a 600×300 array, one column of 300 SPADs may be recharged every 2 ns. This mechanism may result in a low average current draw (e.g., 100 mA estimate for 3V excess). In some embodiments, when one side (e.g., the left side) of the detectors of the lidar is looking at a close range (e.g., utilizing strobe windows associated with a closer distance sub-range), another side (e.g., the right side) of the detectors may be looking at a long range (e.g., utilizing strobe windows associated with a farther distance sub-range). In an embodiment, a cyclic wave of strobe distances may constantly move from left to right. In some embodiments, external systems may compensate (e.g., subtract) to offset the pixel time estimate (e.g., 2 ns×column index).

In some embodiments, strobe windows (e.g., an 81 ns duration) may be generated with a time delay (e.g., 2 ns) to provide substantially constant SPAD recharge power across the SPAD array. For example, if there are 600 columns, 600 strobe windows times 2 ns shifts between strobe windows results in 1.3 µs. In such an embodiment, $1/600^{th}$ of the SPAD capacitance (e.g. 40 nF) may be recharged by 3V every 2 ns, which may result in 100 mA of current.

Figure 14:
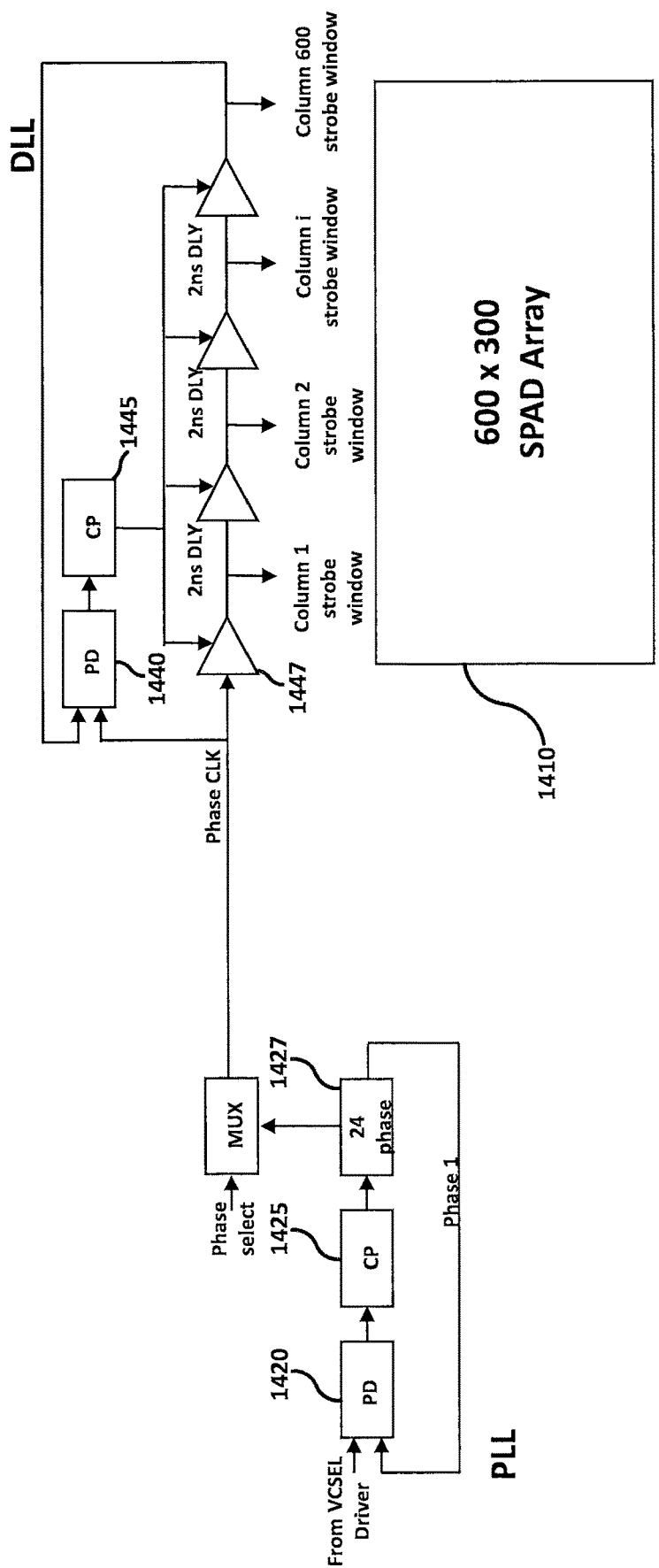
FIG. 14 illustrates an example implementation of an embodiment of a circuit configured to generate a 2 ns strobe window delay according to some embodiments described herein.

FIG. 14 illustrates an example implementation of an embodiment of a circuit configured to generate a 2 ns strobe window delay according to some embodiments described herein. In FIG. 14, a 600×300 SPAD array 1410 is provided as an example in which respective ones of the 600 columns are activated based on a delay.

Referring to FIG. 14, a phase locked loop PLL may include a phase detector 1420, a charge pump 1425, and a filter 1427. The PLL may generate a phase clock signal that is provided to a delay locked loop DLL. The DLL may include a phase detector 1440 and a charge pump 1445. The signal output from the charge pump 1445 may be provided to a series of delay elements 1447 that may be used to generate delayed strobe windows from the phase clock signal (illustrated as Column 1 strobe windows, Column 2 strobe window, etc.) that may be provided to respective ones of the columns of the pixel array 1410. It will be understood that the configuration of FIG. 14 could also be implemented based on rows, rather than columns.

Figure 15:
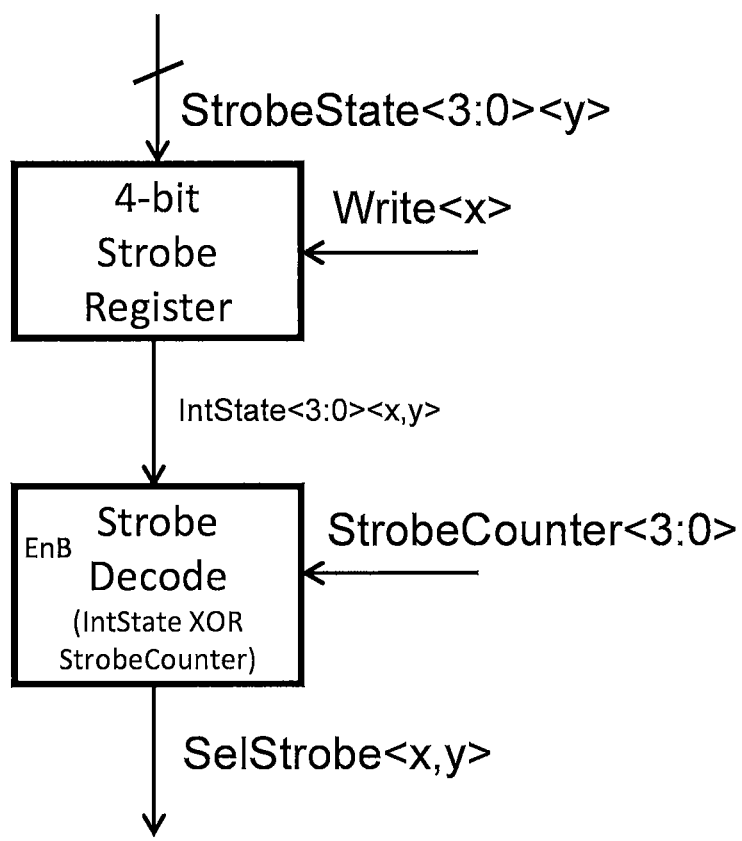
FIG. 15 illustrates a non-limiting example implementation of an embodiment of a strobe decoder according to some embodiments described herein.

FIG. 15 illustrates a non-limiting example implementation of an embodiment of a strobe decoder according to some embodiments described herein. The strobe decoder may be configured to decode a pixel x, y (where x is the column of the pixel, and y is the row of the pixel). Within FIG. 15, StrobeState<3:0><y> is a column based signal, StrobeCounter<3:0> is global to the whole pixel array, IntState<3:0><x,y> is an internal signal in pixel <x,y>, and SelStrobe<x,y> is the strobe signal used internally in pixel x,y to gate the SPADs and pixel activity.

Decoding the pixel x,y may occur in two stages. First, the decoder may latch to store the local strobe number under control of a column signal Write<x>. Second, the decoder may select the correct pulse from the globally distributed StrobeCounter<3:0>.

In some embodiments, spatial strobe patterns in the pixel array may be hardwired and cannot be (or may be difficult to be) altered after chip manufacture. In some embodiments, spatial strobe patterning can be established in a programmable way (e.g., programmatically controlled) by the external system writing a word on StrobeState<3:0> to an internal pixel state IntState<3:0> (see, e.g., FIG. 15). For example, on startup of the sensor chip a controller may load an initial pattern of StrobeState<3:0> values into the pixel array. This may be done, for example, by one pass of a rolling write pulsing Write<x> for each row of the pixel array and loading StrobeState<3:0><y> from a column based register. IntState<3:0> may select a globally distributed (e.g., a Gray Code) strobe count StrobeCounter<3:0> which may cycle from 0 to 15 at a repetition rate corresponding to the maximum distance (for example, 1.3 μs) of the lidar system.

Figure 16:
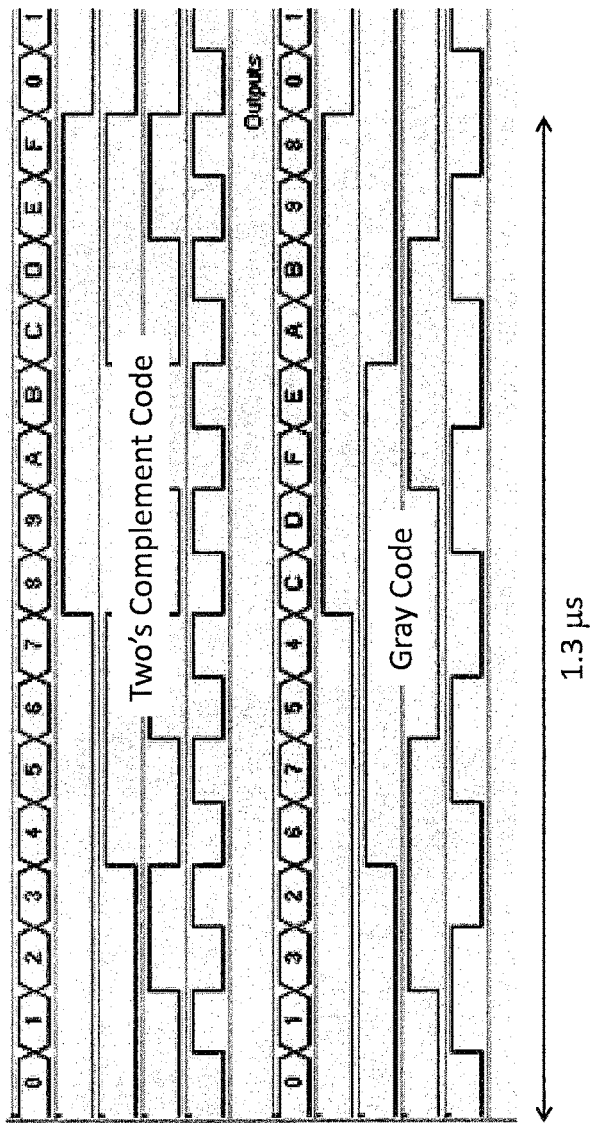
FIG. 16 illustrates an example of global 4-bit Gray code strobe counter according to some embodiments described herein.
Figure 17:
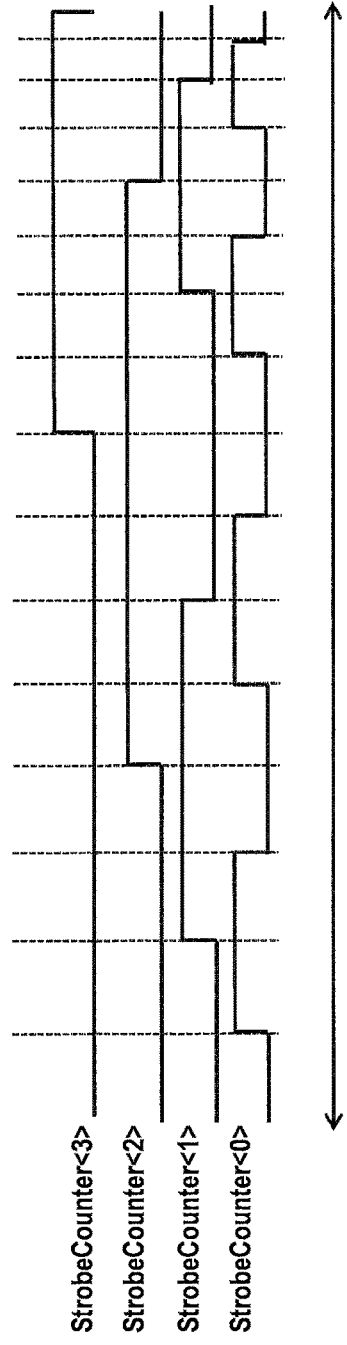
FIG. 17 illustrates an example of a 4-bit non-linear Gray code strobe counter according to some embodiments described herein.

A Gray code is an ordering of the binary numeral system such that two successive values differ in only one bit (binary digit) (e.g., only one of the signal transitions at any given point). FIG. 16 illustrates an example of a global 4-bit Gray code strobe counter according to some embodiments described herein. FIG. 17 illustrates an example of a 4-bit non-linear Gray code strobe counter according to some embodiments described herein. In FIG. 7, different ones of the signals represent different bits of the code. As illustrated in FIG. 17, the code can be changed at the transition points (as shown by the dashed lines in FIG. 17) which, in some embodiments, may be transitioned in accordance with a synchronized clock signal.

After decode, the non-linear Gray code may generate longer strobes at short range and shorter strobes at long range. This may result in a reduction of background noise and may improve center of mass at long range. Conversely longer strobes may accept more background noise at short range where the signal is greater. It will be understood that the codes illustrated in FIGS. 16 and 17 are merely examples and are not intended to be limiting of the present disclosure. Other bit configurations, including those not utilizing Gray codes, may be utilized without deviating from the present invention.

Figure 21:
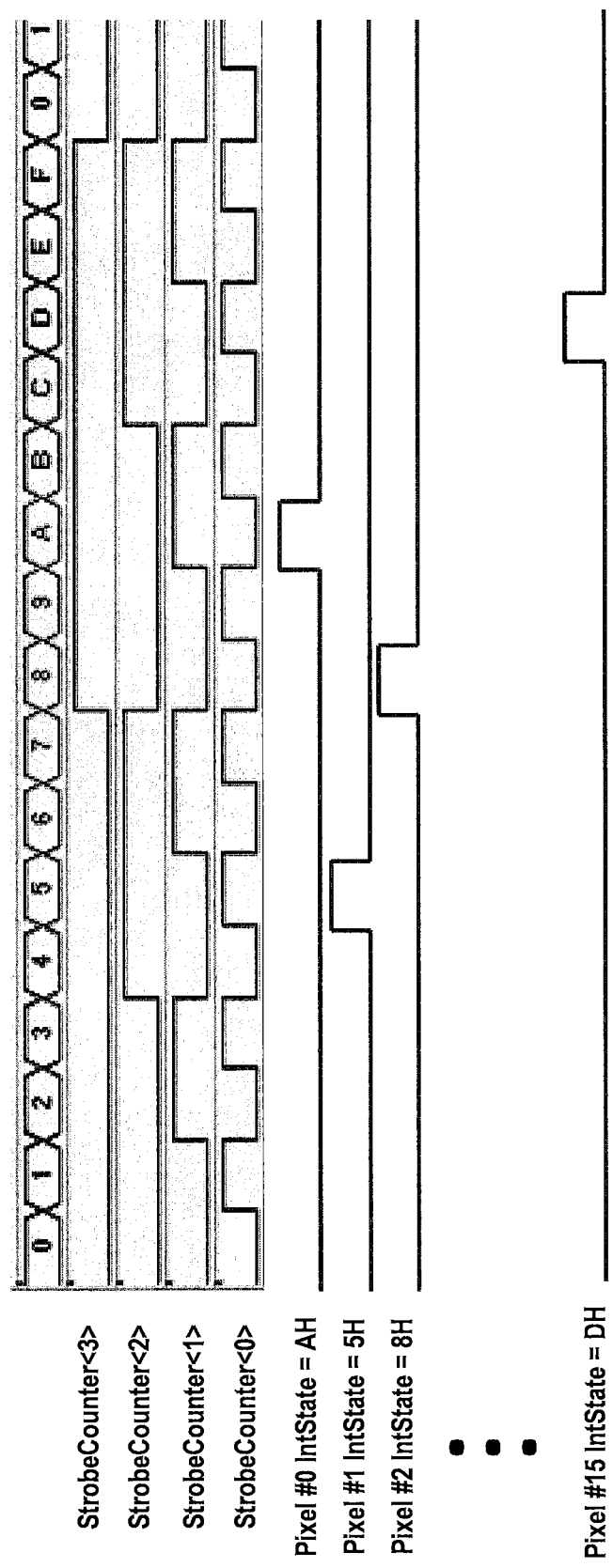
FIG. 21 illustrates an example embodiment of an operation of the strobe decoder of FIG. 15.

FIG. 21 illustrates an example embodiment of an operation of the strobe decoder of FIG. 15. In FIG. 21, a sequence of the strobe windows may be programmed at power up of the sensor. For example, different values of IntState may be designated for different pixels. In the example of FIG. 21, a hexadecimal value of 0xA is designated for Pixel #0, a hexadecimal value of 0x5 is designated for Pixel #1, a hexadecimal value of 0x8 is designated for Pixel #2, and so on, up to Pixel #15, which is designated with a hexadecimal value of 0xD. These designations are merely examples and not intended to limit the embodiments described herein. As illustrated in FIG. 21, the code used for the Strobe Counter (e.g., a two's complement code) may be used in combination with the strobe decoder to programmatically (e.g., by operation of a circuit and/or processor) distribute the strobe windows amongst the pixels.

In some embodiments, subframes may be read out according to a rolling shutter scheme scanning rows out through an ADC or digital readout. While reading out pixel data for row y, the IntState<3:0> for row y may also be read out from the pixel, incremented, and written back into the same pixel by a column parallel digital circuit.

Though a method of a strobe update has been described, the embodiments described herein are not limited thereto. Other sequences of strobe update are possible without deviating from the present inventive concepts. For example, the IntState<3:0> for the pixel may be decremented if the target is deemed to be coming towards the system by an on-chip (column based) or off-chip controller. As another example, a linear feedback shift register (LFSR) sequence may be used for non-contiguous but cyclic strobe hopping. As another example, if the target is deemed by an on-chip (column based) or off-chip controller to have been acquired, the strobe can be left unchanged to readout the same strobe subframe at a higher frame rate. This can be done by comparing the photon count signal to a (strobe dependent) threshold.

Figure 18:
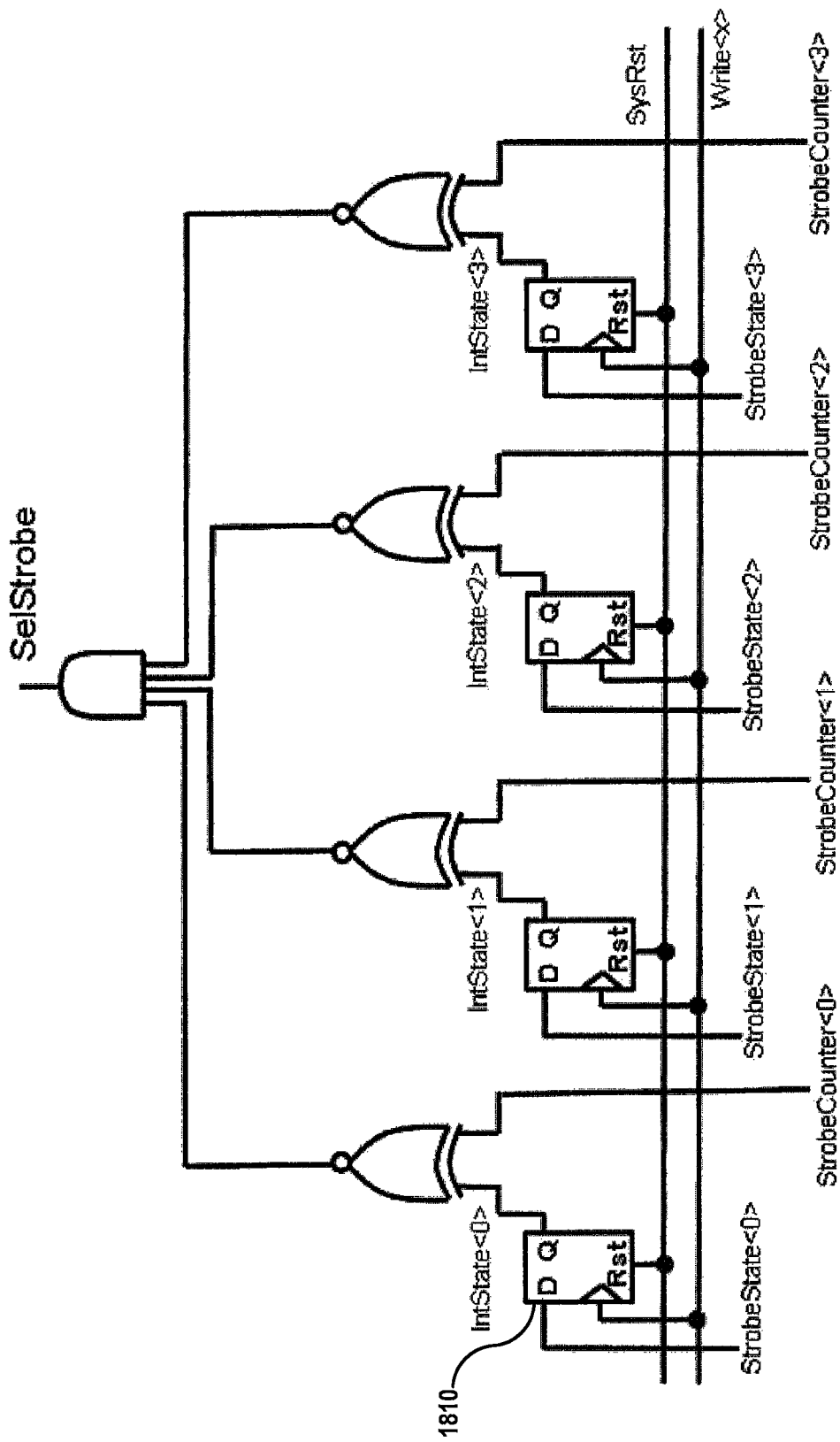
FIG. 18 illustrates a non-limiting example implementation of a strobe decoder according to some embodiments described herein.

FIG. 18 illustrates a non-limiting example implementation of a strobe decoder according to some embodiments described herein. As illustrated in FIG. 18, the strobe signal (e.g., SelStrobe<x,y>) used in the pixel array to activate the detectors (e.g., the SPADS) may be generated based on the StrobeState and StrobeCounter signals. As discussed herein, the StrobeState signal may be a column-based signal and the StrobeCounter signal may be global to the whole pixel array. In a first stage of the decoding, the local strobe number may be latched under control of the column signal Write<x>. In the second stage of the decoding, the SelStrobe signal may be decoded based on the output of the first stage (e.g., IntState) and the StrobeCounter signal. The system may be reset under control of the SysRst signal. In some embodiments, the d-type flip flops 1810 illustrated in FIG. 18 may be implemented as latches or SRAM for reduced area.

Figure 19:
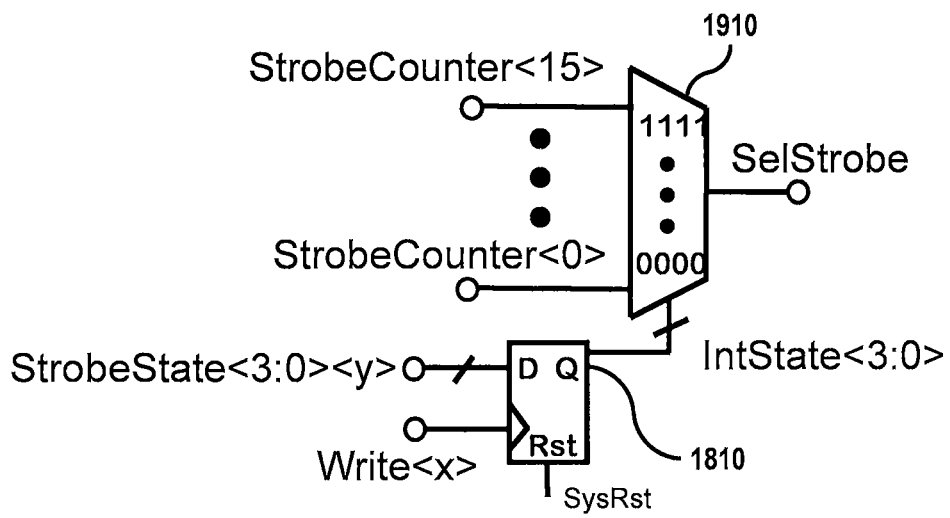
FIG. 19 illustrates a non-limiting example implementation of a strobe decoder according to some embodiments described herein.

FIG. 19 illustrates a non-limiting example implementation of a strobe decoder according to some embodiments described herein. As illustrated in FIG. 19, the strobe decoder could also be implemented as a 16-to-1 multiplexer 1910 controlled by IntState<3:0> receiving inputs from StrobeState<15:0> global strobe signals. In this case, the strobes may be generated individually, allowing overlapping strobes to be distributed. In some embodiments, the use of more wires and a multiplexer may occupy a larger silicon area. The input to the multiplexer 1910 may be provided by a similar d-type flip flop 1810 as discussed with respect to FIG. 18.

Figure 20:
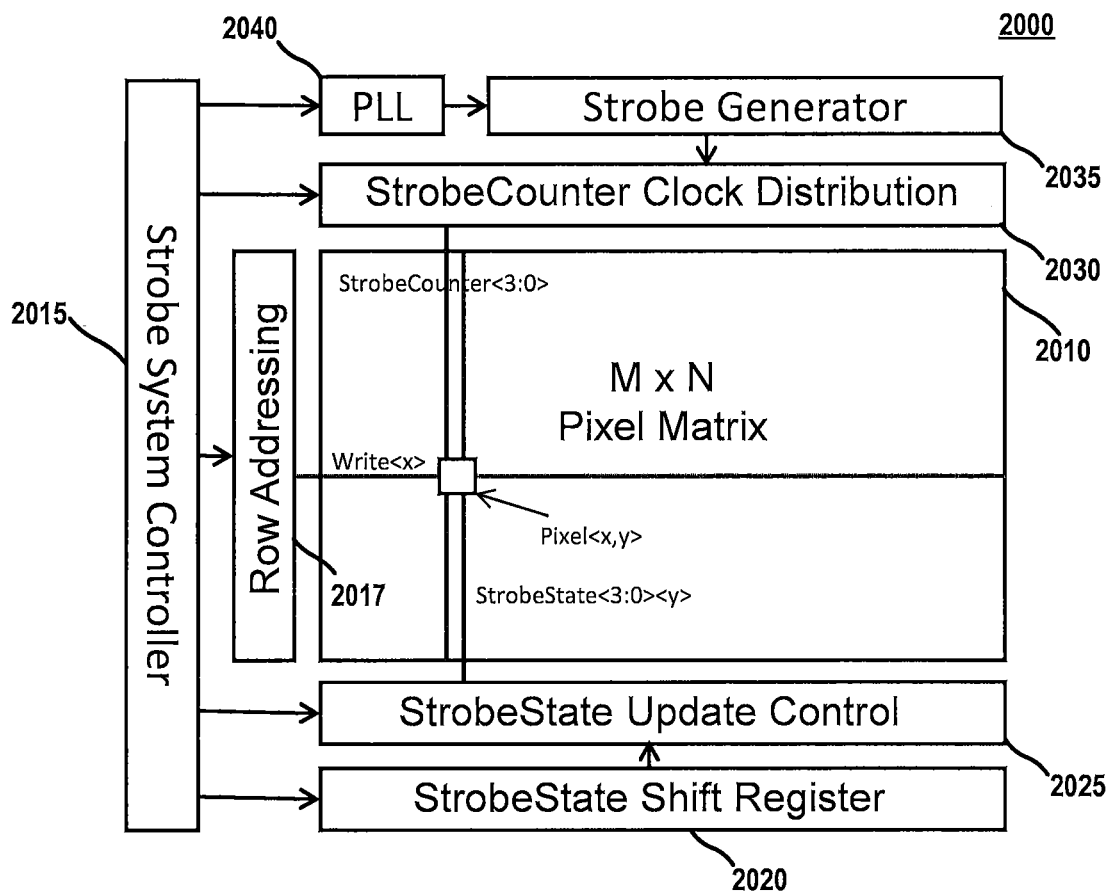
FIG. 20 illustrates a non-limiting example implementation of a programmable strobe block according to some embodiments described herein.

FIG. 20 illustrates a non-limiting example implementation of a programmable strobe block 2000 according to some embodiments described herein. In the block diagram of FIG. 20, only blocks relevant to the spatial strobe distribution (not the main lidar operation) are illustrated. Referring to FIG. 20, a pixel array 2010 may be provided. The pixel array 2010 may have M rows and N columns. The configuration of the strobe windows provided by to the pixel array 2010 may be coordinated and/or controlled by the strobe system controller circuit 2015. The strobe system controller circuit 2015 may be, for example, part of a control circuit such as control circuit 105 of FIG. 1. As discussed herein with respect to FIGS. 15-19, a programmable strobe distribution may be based on signals such as StrobeCounter, StrobeState, and Write. In other words, the application of a particular strobe window to a given pixel (e.g., Pixel<x,y>) may be controlled based on a given status of the StrobeCounter, StrobeState, and Write signals. The StrobeState signal may be provided by the StrobeState update control circuit 2025 based on communication between the strobe system controller circuit 2015 and the StrobeState shift register circuit 2020. The StrobeState shift register circuit 2020 may be under the further control of the strobe system controller circuit 2015.

The StrobeCounter signal may be provided by the StrobeCounter clock distribution circuit 2030 based on communication between the strobe system controller circuit 2015 and the strobe generator circuit 2035. The strobe generator circuit 2035 may receive an input signal from a phase locked loop 2040 under control of the strobe system controller circuit 2015

The Write signal may be provided by a row addressing circuit 2017 under control of the strobe system controller circuit 2015. Though FIG. 20 illustrates an example implementation for generating the StrobeState, StrobeCounter, and Write signals, it will be appreciated that other circuit configuration are possible without deviating from the inventive concepts. As illustrated in FIG. 20, peripheral circuits may be configured that write in the strobe state, allowing other circuits to apply global strobe counter signals. As a result, customization of the spatial and temporal Sampling of the detectors may be done programmatically. The customization may be done on power up of the device and may be done relatively slowly via serial chains and/or modified if required.

It will be understood that various ones of the strobe distribution schemes discussed herein (e.g., pixel sub-array, row-based, column-based) may be utilized with various ones of the strobe timing schemes discussed herein (e.g., overlapping strobes, nonlinear strobes, random strobes, constant activity strobes, constant sliding strobes) without deviating from the invention.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment," "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention.

The invention claimed is:

1. A Light Detection and Ranging (lidar) apparatus, comprising:
   an emitter array comprising a plurality of emitter units configured to emit optical signals responsive to respective emitter control signals;
   a detector array comprising a plurality of detector pixels configured to be activated and deactivated for respective strobe windows between pulses of the optical signals; and
   a control circuit configured to provide a strobe signal to activate a first subset of the detector pixels while leaving a second subset of the detector pixels inactive.

2. The lidar apparatus of claim 1, wherein the emitter array is further configured to emit the optical signals with an emitter cycle between consecutive ones of the optical signals, and
   wherein the control circuit is further configured to provide the strobe signal to activate the first subset of the detector pixels at a first time delay during the emitter cycle while the second subset is inactive.

3. The lidar apparatus of claim 2, wherein the strobe signal is a first strobe signal, and
   wherein the control circuit is further configured to provide a second strobe signal to activate the second subset of the detector pixels at a second time delay during the emitter cycle while leaving the first subset of the detector pixels inactive.

4. The lidar apparatus of claim 3, wherein the second time delay is greater than the first time delay.

5. The lidar apparatus of claim 1, wherein the detector array comprises rows and columns, and
   wherein the first subset of the detector pixels comprises a row of the detector array or a column of the detector array.

6. The lidar apparatus of claim 1, wherein the detector array comprises a first sub-array comprised of detector pixels that are physically collocated and a second sub-array comprised of detector pixels that are physically collocated, and
   wherein the first subset of the detector pixels comprises a first detector pixel of the first sub-array and a second detector pixel of the second sub-array.

7. A Light Detection and Ranging (lidar) apparatus, comprising:
   an emitter configured to emit a first optical signal and a second optical signal with an emitter cycle therebetween;
   a detector array comprising a plurality of detector pixels configured to be activated and deactivated for respective strobe windows during the emitter cycle; and
   a control circuit configured to apply a first strobe window within the emitter cycle to a first subset of the plurality of detector pixels at a first time delay within the emitter cycle and to apply a second strobe window within the emitter cycle to a second subset of the plurality of detector pixels at a second time delay, different from the first time delay, within the emitter cycle.

8. The lidar apparatus of claim 7, wherein a first portion of the first strobe window overlaps a second portion of the second strobe window within the emitter cycle.

9. The lidar apparatus of claim 7, wherein the detector array comprises rows and columns, and
   wherein the first subset of the detector pixels comprises a row of the detector array or a column of the detector array.

10. The lidar apparatus of claim 7, wherein the first subset of the detector pixels comprises a first detector pixel and a second detector pixel, and
    wherein the control circuit is configured to activate the second detector pixel at a time offset after activating the first detector pixel.

11. The lidar apparatus of claim 7, wherein a first duration of the first strobe window is different than a second duration of the second strobe window.

12. The lidar apparatus of claim 7, wherein the second time delay is greater than the first time delay, and
    wherein a first duration of the first strobe window is shorter than a second duration of the second strobe window.

13. The lidar apparatus of claim 7, wherein the detector array comprises a first sub-array comprised of detector pixels that are physically collocated and a second sub-array comprised of detector pixels that are physically collocated, and
    wherein the first subset of the detector pixels comprises a first detector pixel of the first sub-array and a second detector pixel of the second sub-array.

14. A Light Detection and Ranging (lidar) apparatus, comprising:
    an emitter configured to emit a first optical signal and a second optical signal with an emitter cycle therebetween;
    a detector array comprising a plurality of detector pixels configured to be activated and deactivated for respective strobe windows during the emitter cycle; and
    a control circuit configured to provide a strobe signal to activate a first subset of the plurality of detector pixels and a second subset of the plurality of detector pixels within the emitter cycle at different respective time delays with respect to the first optical signal.

15. The lidar apparatus of claim 14, wherein the control circuit is further configured to provide the strobe signal to activate the first subset during a first strobe window within the emitter cycle, and
    wherein the control circuit is further configured to provide the strobe signal to activate the second subset during a second strobe window within the emitter cycle.

16. The lidar apparatus of claim 15, wherein a first portion of the first strobe window overlaps a second portion of the second strobe window.

17. The lidar apparatus of claim 15, wherein a first duration of the first strobe window is different that a second duration of the second strobe window.

18. The lidar apparatus of claim 14, wherein the first subset of the detector pixels comprises a first detector pixel and a second detector pixel, and
    wherein the control circuit is configured to activate the second detector pixel at a time offset after activating the first detector pixel.

19. The lidar apparatus of claim 14, wherein the different respective time delays are configured to be programmatically controlled.

20. The lidar apparatus of claim 15, wherein a first respective time delay of the first strobe window is shorter than a second respective time delay of the second strobe window, and wherein a first duration of the first strobe window is shorter than a second duration of the second strobe window.

21. The lidar apparatus of claim 3, wherein the first strobe signal is configured to be active for a first time duration, and wherein the second strobe signal is configured to be active for a second time duration, different from the first time duration.

22. The lidar apparatus of claim 1, wherein the first subset of the detector pixels comprises a first detector pixel and a second detector pixel, and wherein the control circuit is further configured to activate the second detector pixel at a time offset after activating the first detector pixel.

23. The lidar apparatus of claim 7, wherein the first time delay and the second time delay are configured to be programmatically controlled.

24. The lidar apparatus of claim 7, wherein the second time delay is greater than the first time delay, and wherein a first duration of the first strobe window is longer than a second duration of the second strobe window.

25. The lidar apparatus of claim 14, wherein the detector array comprises rows and columns, and wherein the first subset of the detector pixels comprises a row of the detector array or a column of the detector array.

26. The lidar apparatus of claim 15, wherein a first respective time delay of the first strobe window is shorter than a second respective time delay of the second strobe window, and wherein a first duration of the first strobe window is longer than a second duration of the second strobe window.

* * * * *